(12) United States Patent  (10) Patent No.: US 9,049,854 B2
Ellsworth  (45) Date of Patent: Jun. 9, 2015

(54) CROP SPRAYING VEHICLE

(76) Inventor: Mark Ellsworth, Tempe, AZ (US)

( * ) Notice: Subject to any disclaimer, the term of this patent is extended or adjusted under 35 U.S.C. 154(b) by 778 days.

(21) Appl. No.: 11/733,703

(22) Filed: Apr. 10, 2007

(65) Prior Publication Data

US 2008/0191055 A1 Aug. 14, 2008

Related U.S. Application Data

(63) Continuation-in-part of application No. 10/290,567, filed on Nov. 7, 2002, now abandoned.

(51) Int. Cl.
*B05B 1/20* (2006.01)
*A01M 7/00* (2006.01)

(52) U.S. Cl.
CPC ............ *A01M 7/0053* (2013.01); *A01M 7/0075* (2013.01)

(58) Field of Classification Search
CPC ........................ A01M 7/0053; A01M 7/0075
USPC .................. 239/159, 161, 163–168, 172, 176
See application file for complete search history.

(56) References Cited

U.S. PATENT DOCUMENTS

| | | | |
|---|---|---|---|
| 3,731,879 A | | 5/1973 | Hoegen Dijkhof |
| 3,756,597 A | * | 9/1973 | Monti ........................ 482/106 |
| 4,561,591 A | | 12/1985 | Ballu |
| 4,650,117 A | | 3/1987 | Dudley |
| 4,880,160 A | | 11/1989 | Patterson et al. |
| 6,131,821 A | | 10/2000 | Nejsum |
| 6,234,407 B1 | | 5/2001 | Knight et al. |

* cited by examiner

*Primary Examiner* — Christopher Kim
(74) *Attorney, Agent, or Firm* — Greg L. Martinez

(57) ABSTRACT

A crop spraying vehicle includes a mast arm having a mast arm sleeve slidingly engaged with it. A crop spraying apparatus is coupled to the mast arm sleeve with a pendulum arm. The engagement between the mast arm and mast arm sleeve restricts and allows the transverse and longitudinal rotation, respectively, of the crop spraying apparatus.

32 Claims, 4 Drawing Sheets

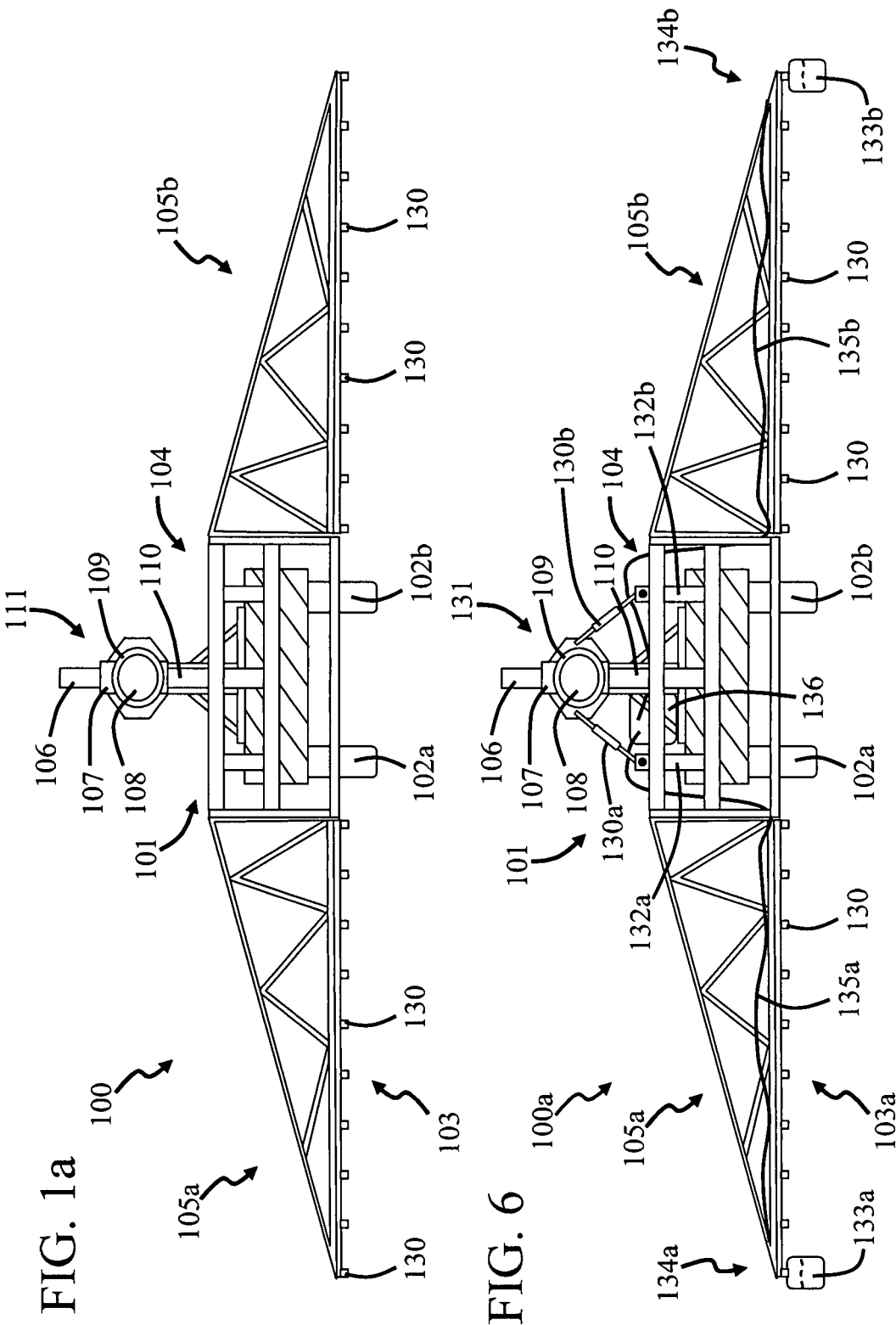

CROP SPRAYING VEHICLE

CROSS-REFERENCE TO RELATED APPLICATIONS

This application is a continuation in part of U.S. application Ser. No. 10/290,567 filed on Nov. 7, 2002 by the same inventor, the contents of which are incorporated herein by reference.

BACKGROUND OF THE INVENTION

1. Field of the Invention

This invention relates generally to a crop spraying vehicle having outwardly extending booms.

2. Description of the Related Art

There are many different types of agricultural vehicles used to spray a field of crops. The spray generally includes a chemical which protects the crops from pests, fungi and/or weeds. Some of these agricultural vehicles, such as those disclosed in U.S. Pat. No. 6,131,821 to Nejsum and U.S. Pat. No. 6,234,407 to Knight, include a boom extending outwardly from both of its sides. The boom is used to carry nozzles connected to a tank of chemicals through piping. The chemicals are applied to the crops by flowing them from the tank, through the piping and spraying them out the nozzles over a spray area.

The spray area can be increased by increasing the length of the booms and by increasing the number of nozzles spaced along their length. It is desirable to increase the spray area so that the field can be sprayed more efficiently. The field is sprayed more efficiently as the spray area is increased because the vehicle requires a fewer number of passes to cover it with chemicals.

BRIEF SUMMARY OF THE INVENTION

The present invention employs a crop spraying vehicle which includes a mast arm having a mast arm sleeve slidingly engaged with it. The engagement between the mast arm and mast arm sleeve restricts and allows the transverse and longitudinal rotation, respectively, of a crop spraying apparatus coupled to the mast arm. In some embodiments, the crop spraying apparatus includes outwardly extending booms which carry trim weight containers. The weight carried by the trim weight containers is adjustable to adjust the longitudinal rotation of the crop spraying apparatus so the booms are balanced. The trim weight containers can also be used to tilt bias the booms, which is useful when spraying on a tilted surface, such as a hill side.

These and other features, aspects, and advantages of the present invention will become better understood with reference to the following drawings and description.

BRIEF DESCRIPTION OF THE DRAWINGS

FIG. 1a is a rear view of a crop spraying vehicle, in accordance with the invention, with a pendulum apparatus which carries a crop spraying apparatus.

FIG. 1b is a top view of the crop spraying vehicle of FIG. 1a.

FIG. 6 is a rear view of a crop spraying vehicle with another embodiment of a pendulum and crop spraying apparatus, in accordance with the invention.

DETAILED DESCRIPTION OF THE INVENTION

Figure 1B:
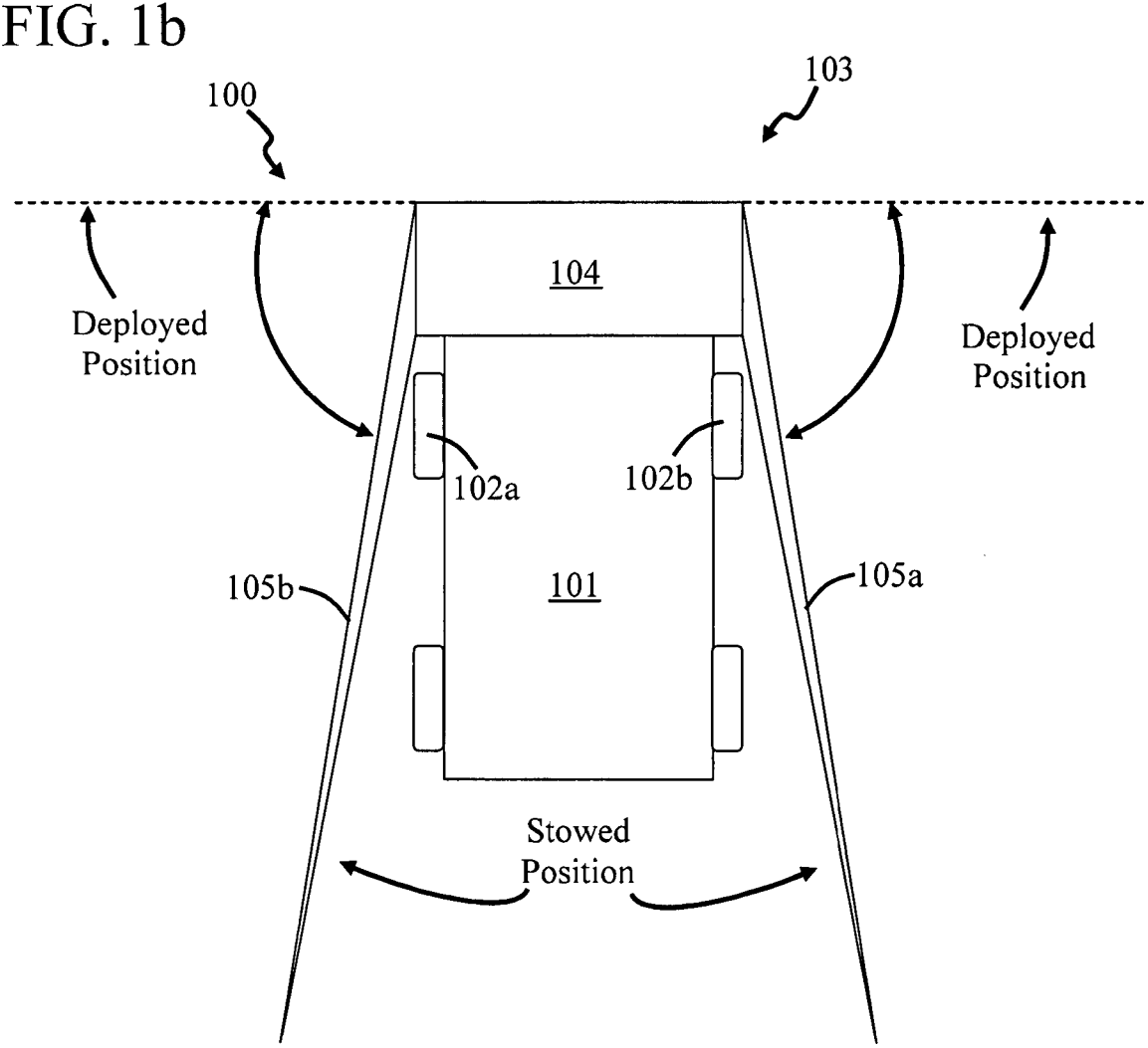

FIG. 1a is a rear view of a crop spraying vehicle 100, in accordance with the invention, and FIG. 1b is a top view of vehicle 100. In this embodiment, vehicle 100 includes a chassis 101 carried by rear wheels 102a and 102b, and a crop spraying apparatus 103 coupled to chassis 101 with a pendulum apparatus 111. It should be noted that pendulum apparatus 111, as well as crop spraying apparatus 103, can include many different materials, such as metal, composites, plastic and/or wood. Chassis 101 is generally that of an agricultural tractor, which are made by many different manufactures, such as John Deere. These agricultural tractors can be of many different types, such as utility, row-crop, and four wheel drive tractors, among others.

In this embodiment, crop spraying apparatus 103 includes a center support section 104 coupled with pendulum apparatus 111. Booms 105a and 105b are attached to center support section 104 and extend outwardly therefrom and away from pendulum apparatus 111. Booms 105a and 105b are repeatably moveable between deployed and stowed positions, as shown in FIGS. 1a and 1b, respectively. Booms 105a and 105b carry tubing (not shown) connected between spray nozzles 130 and a tank (not shown) for holding chemicals. In operation, the chemicals flow from the tank and through the tubing, and are sprayed out nozzles 130.

Nozzles 130 are carried by and distributed along booms 105a and 105b and spray the chemicals downwardly and away from crop spraying apparatus 103. It is desirable to have booms 105a and 105b extend further away from chassis 101 so that more nozzles 130 can be carried by booms 105a and 105b and the sprayers can be distributed over a larger distance away from center support section 104. In this way, crop spraying vehicle 100 has a larger spray area so that a field can be sprayed more efficiently.

In accordance with the invention, pendulum apparatus 111 is coupled to center support section 104 with a mast arm and mast arm sleeve. The mast arm sleeve is engaged with the mast arm so that crop spraying apparatus 103 is allowed to roll. In this way, crop spraying apparatus 103 is self-leveling and booms 105a and 105b remain balanced.

Figure 2:
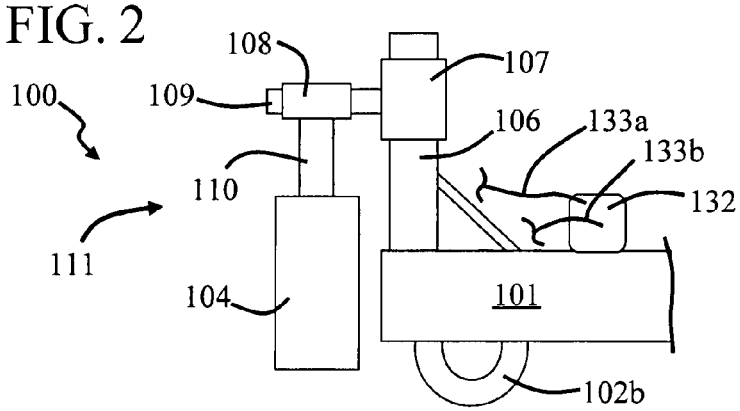
FIG. 2 is a partial side view of the crop spraying vehicle of FIG. 1.
Figure 3:
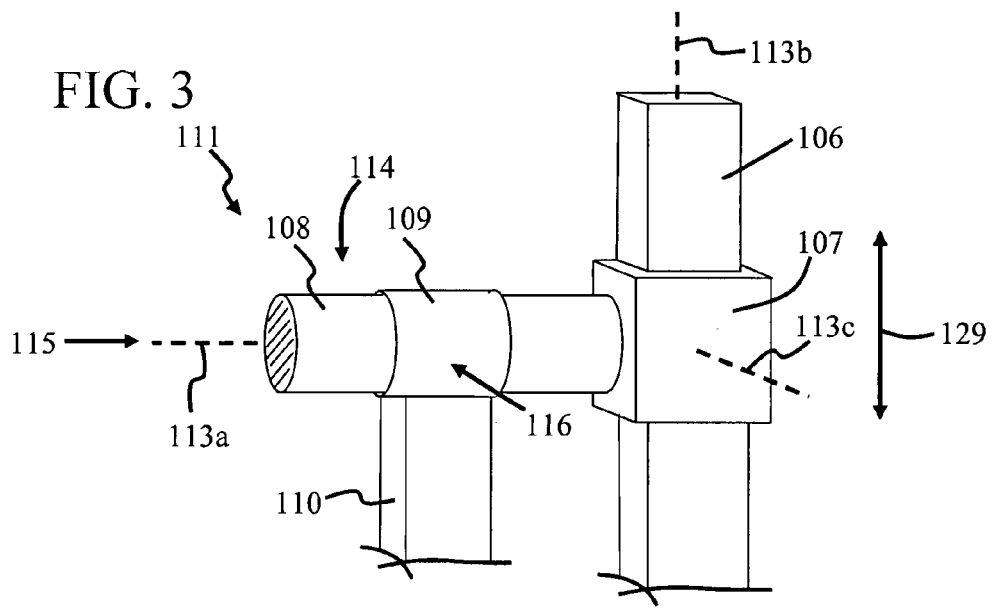
FIG. 3 is a close-up perspective view of the pendulum apparatus included with the crop spraying vehicle of FIG. 1.

FIG. 2 is a partial side view of crop spraying vehicle 100 and FIG. 3 is a perspective view of pendulum apparatus 111. In this embodiment, pendulum apparatus 111 includes a mast 106 attached to and extending upwardly from chassis 101. It should be noted that mast 106 can be attached to chassis 101 in many different ways, such as with bolts and/or welding. Here, mast 106 extends upwardly from an upwardly facing surface of chassis 101, although it can be attached to other surfaces in other examples. For example, a side surface or a slanted surface of chassis 101 can be used. While pendulum apparatus 111 includes a single mast, it can include more than one mast in other embodiments, a few of which will be discussed below with FIGS. 7a, 7b and 8.

In this embodiment, a mast sleeve 107 is slidingly engaged with mast 106, and a mast arm 108 is connected to mast sleeve 107 so it extends outwardly therefrom and away from chassis 101. In accordance with the invention, a mast arm sleeve 109 is slidingly engaged with mast arm 108. Further, a pendulum arm 110 is connected to mast arm sleeve 109 so it extends downwardly therefrom where it is connected to center support section 104. In this way, center support section 104 is coupled to mast arm 108 through mast arm sleeve 109 and center support section 104 is coupled to chassis 101 with pendulum apparatus 111.

As mentioned above, mast sleeve 107 is slidingly engaged with mast 106 so it is moveable in a direction 129. When mast sleeve 107 moves upwardly along mast 106 away from chassis 101, mast arm 108 also moves upwardly. Further, crop spraying apparatus 103 is moved upwardly away from the ground (not shown) in response to the upward movement of mast arm 108. When mast sleeve 107 moves downwardly along mast 106 towards chassis 101, mast arm 108 also moves downwardly. Further, crop spraying apparatus 103 is moved downwardly towards the ground (not shown) in response to the downward movement of mast arm 108.

It should be noted that the components included in pendulum apparatus 111 can have many different shapes. In this embodiment, mast arm 108 and mast arm sleeve 109 are cylindrical in shape, and mast arm sleeve 109 includes a central opening shaped and dimensioned for slidingly engaging mast arm 108. Further, mast 106 is rectangular in shape and mast sleeve 107 is square in shape with a central opening shaped and dimensioned for slidingly engaging mast 106. The shape of mast arm sleeve 109 will be discussed in more detail presently.

Figure 4A:
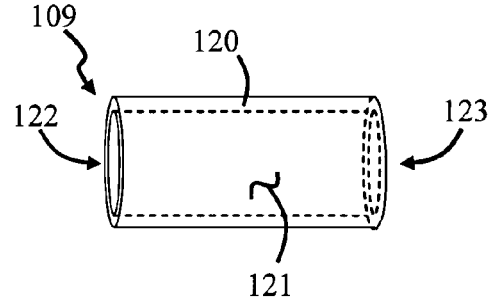
FIG. 4a is a perspective view of a mast arm sleeve included with the pendulum apparatus of FIG. 1.

FIG. 4a is a perspective view of mast arm sleeve 109. In this embodiment, mast arm sleeve 109 includes a sleeve body 120 having a channel 121 extending therethrough between opposed openings 122 and 123. Channel 121 and openings 122 and 123 are shaped and dimensioned so that mast arm 108 can extend through them and sleeve body 120. In this way, mast arm sleeve 109 slidingly engages mast arm 108. It should be noted that mast arm sleeve 109 can have many other configurations, one of which will be discussed presently.

Figure 4B:
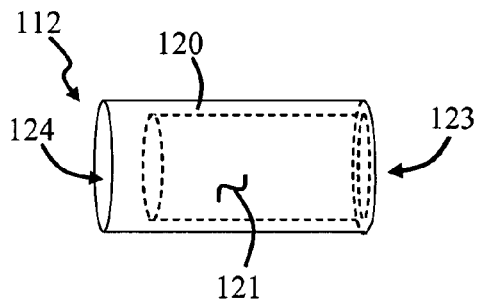
FIG. 4b is a perspective view of another embodiment of a mast arm sleeve which can be used with the pendulum apparatus of FIG. 1.

FIG. 4b shows another embodiment of a mast arm sleeve, denoted as mast arm sleeve 112. In this embodiment, mast arm sleeve 112 includes sleeve body 120 with channel 121 extending between opening 123 and a sidewall 124. Here, channel 121 and opening 123 are shaped and dimensioned so that mast arm 108 can extend through them and sleeve body 120 so it engages sidewall 124. In this way, mast arm sleeve 112 slidingly engages mast arm 108. It should be noted that, in these embodiments, mast arm sleeves 109 and 112 are cylindrical in shape, but they can have other shapes in other examples, as mentioned above. However, their shape is generally chosen to match the shape of mast arm 108 to facilitate them being slidingly engaged together. It should also be noted that mast arm sleeves 109 and 112 can include many different materials, but they generally include metal, such as steel.

Figure 5A:
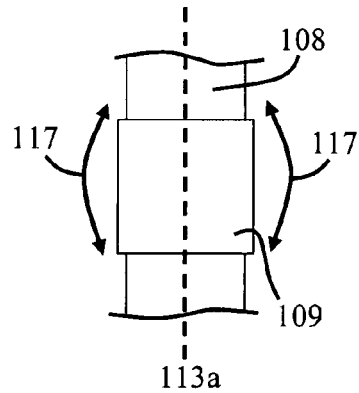
FIGS. 5a, 5b and 5c are top, front and side views of the mast arm sleeve of FIG. 4a slidingly engaged with a mast arm, and included with the pendulum apparatus of FIG. 1.
Figure 5B:
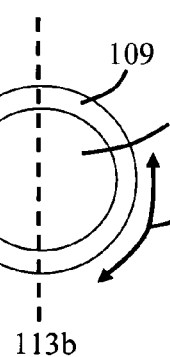
Figure 5C:
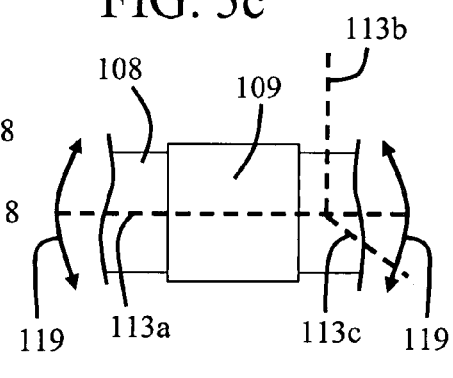

FIGS. 5a, 5b and 5c are top, front and side views, respectively, looking in directions 114, 115 and 116, respectively, of FIG. 3, showing mast arm sleeve 109 slidingly engaged with mast arm 108. As will be discussed in more detail presently, the engagement between mast arm sleeve 109 and mast arm 108 restricts and allows the transverse and longitudinal rotation, respectively, of center support section 104. In this way, the transverse and longitudinal rotation of crop spraying apparatus 103 is also restricted and allowed, respectively, by the engagement between mast arm sleeve 109 and mast arm 108.

It should be noted that the longitudinal rotation of crop spraying apparatus 103 corresponds to its roll and the transverse rotation of crop spraying apparatus 103 corresponds to its pitch and yaw. Hence, crop spraying apparatus 103 is coupled with mast arm 108 through mast arm sleeve 109 so its roll movement is allowed, but its pitch and yaw movement is restricted. The roll is the rotation about an axis 113a of mast arm 108 (FIG. 3) and is indicated by rotation arrows 118 (FIG. 5b). The yaw is the rotation about an axis 113b (FIG. 3) of mast 106 and is indicated by rotation arrows 117 (FIG. 5a). The pitch is the rotation about an axis 113c (FIG. 3) and is indicated by rotation arrows 119 (FIG. 5c).

In accordance with the invention, when center support section 104 rotates in the direction of rotation arrows 117 and/or 119 (FIGS. 5a and 5c), mast arm sleeve 109 engages mast arm 108 so this rotational movement is restricted. Hence, mast arm sleeve 109 engages mast arm 108 in response to being transversely rotated and this restricts the transverse rotation of crop spraying apparatus 103. In this way, the yaw and pitch of crop spraying apparatus 103 is restricted by the engagement between mast arm sleeve 109 and mast arm 108.

Further, in accordance with the invention, when crop spraying apparatus 103 rotates in the direction of rotation arrows 118 (FIG. 5b), mast arm sleeve 109 rotates about mast arm 108. Hence, mast arm sleeve 109 is allowed to rotate relative to mast arm 108 in response to being longitudinally rotated and this allows the longitudinal rotation of crop spraying apparatus 103. In this way, the roll of crop spraying apparatus 103 is allowed by the engagement between mast arm sleeve 109 and mast arm 108 and crop spraying apparatus 103 can self-level.

FIG. 6 is a rear view of another embodiment of a crop spraying vehicle, in accordance with the invention, denoted as crop spraying vehicle 10a. In this embodiment, vehicle 100a includes crop spraying apparatus 103a coupled with chassis 101 with a pendulum apparatus 131. Crop spraying apparatus 103a includes crop spraying apparatus 103 with booms 105a and 105b connected to center support section 104, as described above.

In this embodiment, pendulum apparatus 131 includes pendulum apparatus 111 and, in accordance with the invention, it further includes cylinders 130a and 130b connected between mast sleeve 107 and center support section 104. It should be noted that cylinders 130a and 130b can be positioned at many different locations, but they are generally positioned to lock booms 105a and 105b so their movement is restricted. In this embodiment, cylinders 130a and 130b are connected between beams 132a and 132b, respectively, of center support section 104 and opposed sides of mast arm sleeve 107. It is useful to be able to restrict the movement of booms 105a and 105b in several different situations, such as when turning or driving over furrows.

As mentioned above, crop spraying apparatus 103a includes crop spraying apparatus 103. In accordance with the invention, crop spraying apparatus 103a also includes trim weights 133a and 133b carried by booms 105a and 105b, respectively. In this embodiment, trim weights 133a and 133b are positioned at or near distal ends 134a and 134b of booms 105a and 105b, respectively. In accordance with the invention, the weights of trim weights 133a and 133b are adjustable to adjust the roll of crop spraying apparatus 103. This is useful to provide booms 105a and 105b with a desired bias, such as when using vehicle 100 to spray on a tilted surface like a hillside.

In this embodiment, trim weights 133a and 133b include containers for containing a trim weight material, such as rocks and/or metal. The rocks and metal can be manually positioned within and removed from the trim weight containers to provide trim weights 133a and 133b with a desired amount of weight. However, in this particular embodiment, the trim weight material includes a liquid, which can be of many different types, such as water. Hence, trim weights 133a and 133b can be provided with a desired amount of weight by having them contain a desired amount of water.

The weights of trim weights 133a and 133b are adjustable by flowing a fluid into and out of their corresponding containers. The fluid can be flowed into and out of the trim weight containers in many different ways, such as by manually placing the fluid therein. In this particular embodiment, however, a pump 136 is used to flow the fluid into and out of the trim weight containers. Pump 136 is carried by chassis 101 and is in fluid communication with trim weights 133a and 133b through fluid conduits 135a and 135b, respectively. Fluid conduits 135a and 135b extend from pump 136 and along booms 105a and 105b, respectively. Pump 136 can be of many different types, such as a water pump. Further, fluid conduits 135a and 135b can be of many different types, such as rubber and/or plastic tubing.

When pump 136 flows water into trim weight 133a through fluid conduit 135a and out of trim weight 133b through fluid conduit 135b, mast arm sleeve 109 rolls relative to mast arm 108 so that booms 105a and 105b move downwardly and upwardly, respectively. When pump 136 flows water out of trim weight 133a through fluid conduit 135a and into trim weight 133b through fluid conduit 135b, mast arm sleeve 109 rolls relative to mast arm 108 so that booms 105a and 105b move upwardly and downwardly, respectively. In this way, the weights of trim weights 133a and 133b are adjustable by flowing a fluid into and out of their corresponding containers. Further, the roll of crop spraying apparatus 103a is controlled by flowing water into and out of the containers of trim weights 133a and 133b.

Figure 7A:
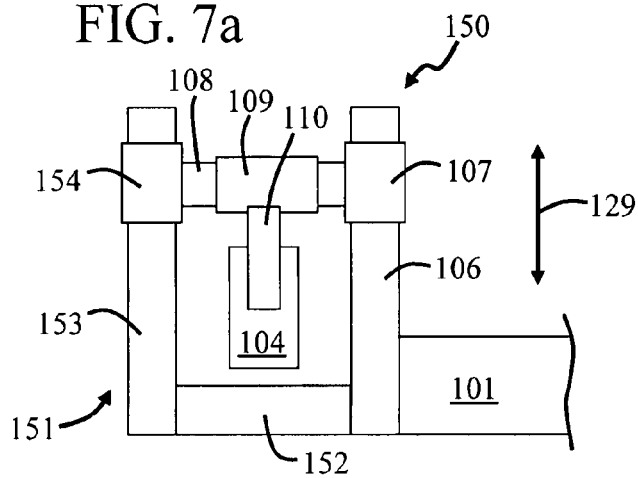
FIG. 7a is a partial side view of a crop spraying vehicle which includes a dual-mast pendulum apparatus, in accordance with the invention.

FIG. 7a is a partial side view of a crop spraying vehicle 150 which includes a dual-mast pendulum apparatus 151, in accordance with the invention. In this embodiment, dual mast pendulum apparatus 151 is carried by chassis 101 and includes a cross-beam 152 which couples mast 106 to a mast 153. Cross-beam 152 is attached between the lower portions of masts 106 and 153, although cross-beam 152 can also be attached to chassis 101 if desired, as in FIG. 7b. It should be noted that, in some embodiments, a cross-beam can be positioned so it extends between the upper ends of masts 106 and 153.

Figure 8:
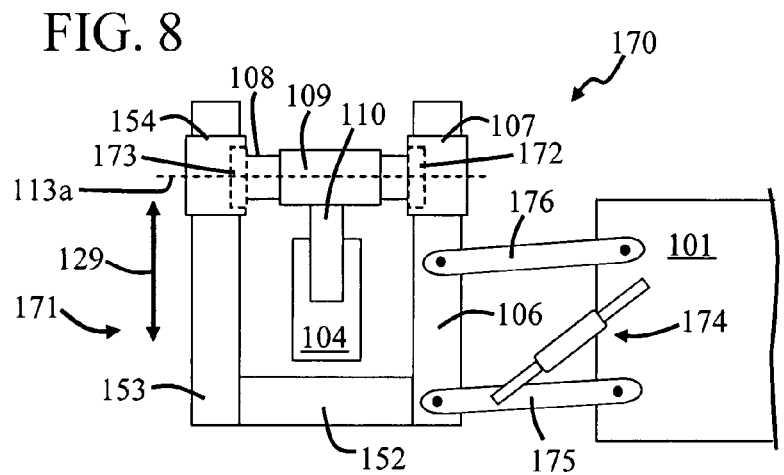
FIG. 8 is a partial side view of a crop spraying vehicle, in accordance with the invention, having a dual-mast pendulum apparatus coupled to a chassis with lift arms.

In this embodiment, mast 106 is attached to and extends upwardly from a side surface of chassis 101. It should be noted, however, that mast 106 can be attached to an upwardly facing surface of chassis 101 in other embodiments, with one being shown in FIG. 2. Further, in other embodiments, mast 106 can be attached to cross-beam 152 instead of chassis 101. For example, in some embodiments, cross-beam 152 is attached to chassis 101 and carries mast 106 so that mast 106 is not directly attached to chassis 101. An embodiment wherein mast 106 and cross-beam 152 are not directly attached to chassis 101 is shown in FIG. 8.

In accordance with the invention, mast sleeve 107 is slidingly engaged with mast 106 and a mast sleeve 154 is slidingly engaged with mast 153. Here, mast sleeve 154 is slidingly engaged with mast 153 in the same manner that mast sleeve 107 is slidingly engaged with mast 106. In this way, mast sleeves 107 and 154 are moveable relative to masts 106 and 153, respectively, in direction 129. Mast arm 108 has opposed ends connected to mast sleeves 107 and 154 so it extends between masts 106 and 153. In this embodiment, mast arm sleeve 109 is slidingly engaged with mast arm 108 so it is moveable between mast sleeves 107 and 154, as well as masts 106 and 153. In other embodiments, such as that discussed with FIG. 8 below, mast arm sleeve 109 is fixedly attached to mast arm 108. Pendulum arm 110 is coupled with mast arm sleeve 109 and extends downwardly therefrom, where it is connected to center support section 104.

As described in more detail above, mast arm sleeve 109 is engaged with mast arm 108 so that its roll movement is allowed, but its pitch and yaw movement is restricted. Hence, the engagement between mast arm sleeve 109 and mast arm 108 restricts and allows the transverse and longitudinal rotation, respectively, of center support section 104. In this way, dual-mast pendulum apparatus 151 restricts and allows the transverse and longitudinal rotation, respectively, of crop spraying apparatus 103.

Dual-mast pendulum apparatus 151 is sturdy because it includes masts (i.e. masts 106 and 153) connected to opposed end of mast arm 108 instead of one mast connected to an end of arm 108, as in pendulum apparatus 111. Hence, mast arm 108 is able to counteract a larger torque applied to it by its engagement with mast arm sleeve 109 in response to the transverse rotation of apparatus 103. By being able to counteract a larger torque, pendulum apparatus 151 allows booms 105a and 105b to extend further away from chassis 101, which provides a larger spray area as discussed in more detail above. In this way, chassis 101 can carry a larger boom.

Figure 7B:
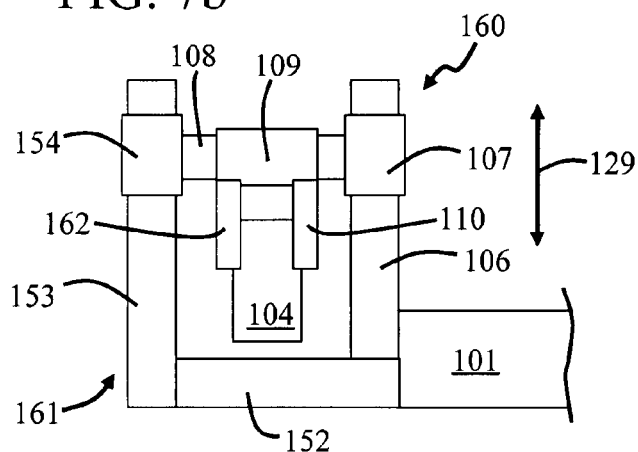
FIG. 7b is a partial side view of a crop spraying vehicle which includes a dual-mast pendulum apparatus having dual pendulum arms, in accordance with the invention.

FIG. 7b is a partial side view of a crop spraying vehicle 160 which includes a dual-mast pendulum apparatus 161, in accordance with the invention. In this embodiment, dual-mast pendulum apparatus 161 is carried by chassis 101 and includes dual-mast pendulum apparatus 151 as described with FIG. 7a. In accordance with the invention, pendulum apparatus 161 further includes a pendulum arm 162 connected between mast arm sleeve 109 and center support section 104. Hence, pendulum apparatus 161 includes dual pendulum arms defined by pendulum arms 110 and 162. Dual pendulum arms are useful because it allows dual-mast pendulum apparatus 161 to carry a heavier crop spraying apparatus 103. For example, crop spraying apparatus 103 can extend outwardly by a further distance since. This is useful because it provides vehicle 100 with a larger spray area.

In this embodiment, pendulum arms 110 and 162 are parallel, but they can be at a non-zero angle relative to each other in other embodiments so they are not parallel. Further, pendulum arms 110 and 162 are spaced apart from each other so that the torque applied to mast arm 108 is distributed over a larger area of mast arm 108. This torque is provided in response to the transverse rotation of center support section 104 providing torque to mast arm sleeve 109. In this way, dual-mast pendulum apparatus 161 can counteract a larger torque. Further, the weight of crop spraying apparatus 103 is distributed over a larger area of mast arm 108. In this way, dual-mast pendulum apparatus 161 can support more weight.

It should be noted that in some embodiments, the dual pendulum arms of pendulum apparatus 161 can be used with a pendulum apparatus having a single mast, such as pendulum apparatus 111. A single mast pendulum apparatus with dual pendulum arms is generally sturdier than a pendulum apparatus with a single pendulum arm, and can counteract a larger torque and support a larger weight. It should also be noted that pendulum apparatus 161 can be a part of center support structure 104 and it can be separate from it.

In some embodiments, mast arm sleeve 109 can extend all the way between mast sleeves 107 and 154 instead of partially between them as shown in FIGS. 7a and 7b. As the length of mast arm sleeve 109 increases, the torque and weight applied to mast arm 108 by crop spraying apparatus 103 is distributed over a larger area of mast arm 108. In this way, pendulum apparatus 161 can counteract a larger maximum torque and support a larger maximum weight. As the length of mast arm sleeve 109 decreases, the torque and weight applied to mast arm 108 by crop spraying apparatus 103 is distributed over a smaller area of mast arm 108. The maximum amount of torque and weight that pendulum apparatus 161 can counteract is smaller if the torque and weight applied to mast arm 108 by crop spraying apparatus 103 is distributed over a smaller area of mast arm 108. It is generally desirable to increase the maximum torque and weight that pendulum apparatus 161 can support so that it is less likely to break.

FIG. 8 is a partial side view of a crop spraying vehicle 170 which includes a dual-mast pendulum apparatus 171, in accordance with the invention. In this embodiment, dual-mast pendulum apparatus 171 is coupled with chassis 101 using lift arms and includes dual-mast pendulum apparatus 151. In this embodiment, however, mast sleeves 107 and 154 are fixedly attached with masts 106 and 153, respectively, instead of slidingly engaged therewith as above. Further, mast arm sleeve 109 is fixedly coupled to mast arm 108 so that they rotate together in response to the roll of center support section 104. It should be noted that mast arm sleeve 109 and mast arm 108 can be separate pieces fixedly coupled together or they can be a single integral piece.

In accordance with the invention, mast arm 108 is rotatably mounted between mast sleeves 107 and 154 and masts 106 and 153, so that it can rotate about axis 113a. Mast arm 108 can be rotatably mounted in many different ways. In this embodiment, mast sleeves 107 and 154 carry bearings 172 and 173, respectively, which engage the ends of mast arm 108. Bearings 172 and 173 can be of many different types, such as roller bearings, and are carried by mast sleeves 107 and 154, respectively, so that they face each other. In this way, mast arm 108 is mounted for rotation.

In this embodiment, dual-mast pendulum apparatus 171 is coupled with chassis 101 with lift arms, so that mast 106 and cross-beam 152 are not directly attached to chassis 101. The lift arms are useful so that pendulum apparatus 171 can be coupled to and decoupled from chassis 101 in an easier manner. In this embodiment, the lift arms include upper and lower lift arms 175 and 176 and corresponding upper and lower lift arms (not shown) positioned at the other side of chassis 101.

Lift arms 175 and 176 can be connected between chassis 101 and pendulum apparatus 171 at many different locations. In this embodiment, lift arm 175 extends between chassis 101 and mast 106 near cross beam 152 and lift arm 176 extends between chassis 101 and mast 106 near mast sleeve 107. It should be noted that the corresponding lift arms at the other side of chassis 101 are connected between pendulum apparatus 171 and chassis 101 at corresponding locations at the other side, but they are not shown for simplicity.

Dual-mast pendulum apparatus 171 is moveable in response to the extension and retraction of lifting cylinders connected to the lift arms. In this embodiment, the lifting cylinders include a lifting cylinder 174 connected between chassis 101 and lower lift arm 175, and operates to rotate arm 175 relative to chassis 101. A corresponding lifting cylinder (not shown) is connected between chassis 101 and the corresponding lower lift arm on the other side of chassis 101, and operates to rotate it. When the lifting cylinders are extended and retracted, the lower lift arms are lowered and raised, respectively. In this way, dual-mast pendulum apparatus 171 is moveable in direction 129 in response to the extension and retraction of lifting cylinders.

It should be noted that pendulum apparatuses 111, 151, and 161 can include separate mast arm sleeves and pendulum arms, or they can be a single integral piece. For example, pendulum arms 110 and 162 of pendulum apparatus 111 can be integral with mast arm sleeve 109 or they can be separate pieces. It should also be noted that in some embodiments, crop spraying vehicles 150, 160 and 170 can include trim weights 134a and 134b and/or locking mechanisms 130a and 130b, as shown in FIG. 6.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A crop spraying vehicle, comprising:
   a mast sleeve;
   a mast arm positioned at a vehicle centerline, wherein the mast arm is connected to the mast sleeve;
   a mast arm sleeve slidingly engaged with the mast arm;
   a single pendulum arm which couples the crop spraying apparatus the mast arm sleeve; and
   a crop spraying apparatus coupled to the mast arm, the engagement between the mast arm and mast, arm sleeve restricting and allowing the transverse and longitudinal rotation, respectively, of the crop spraying apparatus.

2. The vehicle of claim 1, wherein the mast arm sleeve engages the mast arm in response to being transversely rotated.

3. The vehicle of claim 1, wherein the mast am sleeve rotates relative to the mast arm in response to being longitudinally rotated.

4. The vehicle of claim 1, wherein the mast arm sleeve extends along a length of the mast arm.

5. The vehicle of claim 1, wherein the mast arm sleeve has opposed openings through which the mast arm extends.

6. The vehicle of claim 1, wherein the mast arm sleeve is repeatably moveable between positions towards and away from the mast sleeve in response to sliding the mast arm sleeve along the mast arm.

7. The vehicle of claim 1, wherein an end of the mast arm is fixedly connected to the mast sleeve, and an opposed end is positioned away from the mast sleeve.

8. The vehicle of claim 1, wherein the crop spraying apparatus rolls about a single roll axis, wherein the single roll axis extends through the mast arm.

9. The vehicle of claim 1, wherein the crop spraying apparatus includes opposed booms extending outwardly from a center support section.

10. The vehicle of claim 9, further including a hydraulic cylinder connected between the mast sleeve and center support section.

11. The vehicle of claim 9, further including a pair of hydraulic cylinders connected to restrict the movement of the center support section relative to the mast sleeve.

12. The vehicle of claim 9, wherein the center support section is coupled to the mast sleeve through a single roll axis, wherein the single roll axis extends through the mast arm.

13. The vehicle of claim 1, wherein the single pendulum arm is connected to the mast arm sleeve.

14. A crop spraying vehicle, comprising:
   a mast sleeve;

a single mast arm fixedly connected to the mast sleeve;

a mast arm sleeve engaged with the mast arm, the engagement between the mast arm and mast arm sleeve restricting and allowing the transverse and longitudinal rotation, respectively, of the mast arm sleeve relative to the mast arm;

a crop spraying apparatus coupled to the mast arm sleeve with one of more pendulum arms; and a locking mechanism which locks the rotation of the mast arm sleeve relative to the in arm.

15. The vehicle of claim 14, wherein the mast arm sleeve is cylindrical in shape and has at least one opening for receiving the mast arm.

16. The vehicle of claim 14, wherein the mast arm restricts the transverse rotation of the crop spraying apparatus by restricting the transverse rotation of the mast arm sleeve.

17. The vehicle of claim 14, wherein the mast area allows the longitudinal rotation of the crop spraying apparatus by allowing the longitudinal rotation of the mast arm sleeve.

18. The vehicle of claim 14, wherein the single mast arm is positioned at a centerline of the vehicle.

19. The vehicle of claim 14, wherein the mast arm sleeve is cylindrical in shape and has an opening which receives the mast arm.

20. A crop spraying vehicle, comprising:

a first mast;

a mast sleeve slidingly engaged with the first mast;

a mast arm fixedly attached to the mast sleeve;

a mast arm sleeve carried by the mast arm; and a crop spraying apparatus coupled to the mast arm sleeve, the engagement between the mast arm sleeve and mast arm restricting and allowing the transverse and longitudinal rotation, respectively, of the crop spraying apparatus;

wherein the crop spraying apparatus includes outwardly extending booms which carry first and second trim weight containers, the weight of the first and second trim weight containers being adjustable to adjust the longitudinal rotation of the crop spraying apparatus.

21. The vehicle of claim 20, wherein the first and second trim weight containers each contain a trim weight material, the trim weight material being repeatably moveable to and from the first and second trim weight containers.

22. The vehicle of claim 21, further including a fluid conduit in fluid communication with the first trim weight container.

23. The vehicle of claim 22, wherein the fluid conduit is carried by the crop spraying apparatus.

24. The vehicle of claim 21, further including a fluid conduit in fluid communication with the first trim weight container, wherein the fluid conduit allows the trim weight material to flow to and from the first trim weight container.

25. The vehicle of claim 21, further including a pump which flows the trim weight material to and from the first trim weight container.

26. The vehicle of claim 21, wherein the first trim weight container is positioned proximate to a distal end of the crop spraying apparatus.

27. The vehicle of claim 20, further including a fluid conduit which extends along one of the booms, the fluid conduit being in fluid communication with one of the first and second trim weight containers.

28. The vehicle of claim 27, further including a pump in fluid communication with the first trim weight container through the fluid conduit.

29. The vehicle of claim 27, wherein the boom carries a sprayer, and the fluid conduit extends proximate to the sprayer.

30. The vehicle of claim 20, wherein the crop spraying apparatus includes a center support section coupled to the mast sleeve through a single pendulum arm.

31. The vehicle of claim 30, wherein the center support section moves relative to the mast sleeve in response to sliding the mast arm sleeve along the mast arm.

32. A crop spraying vehicle, comprising:

a mast sleeve;

a mast arm positioned at a vehicle centerline, wherein the mast arm is connected to the mast sleeve;

a mast arm sleeve slidingly engaged with the mast arm; and a crop spraying apparatus coupled to the mast arm, the engagement between the mast arm and mast arm sleeve restricting and allowing the transverse and longitudinal rotation, respectively, of the crop spraying apparatus, wherein the mast arm sleeve is repeatably moveable between positions towards and away from the mast sleeve.

* * * * *